(12) United States Patent
Schwabl et al.

(10) Patent No.: US 11,034,059 B2
(45) Date of Patent: Jun. 15, 2021

(54) MIXING DEVICE WITH ADJUSTMENT DEVICE FOR GAP SETTING

(71) Applicant: Henkel AG & Co. KGaA, Düsseldorf (DE)

(72) Inventors: Christian Schwabl, Bregenz (AT); Guenther Baldauf, Hohenweiler (AT); Mario Metzler, Lustenau (AT)

(73) Assignee: Henkel AG & Co. KGaA, Düsseldorf (DE)

(*) Notice: Subject to any disclaimer, the term of this patent is extended or adjusted under 35 U.S.C. 154(b) by 431 days.

(21) Appl. No.: 15/740,609

(22) PCT Filed: Jun. 24, 2016

(86) PCT No.: PCT/AT2016/050228
§ 371 (c)(1),
(2) Date: Dec. 28, 2017

(87) PCT Pub. No.: WO2017/004637
PCT Pub. Date: Jan. 12, 2017

(65) Prior Publication Data
US 2018/0194037 A1    Jul. 12, 2018

(30) Foreign Application Priority Data
Jul. 3, 2015    (AT) .................................. A 436/2015

(51) Int. Cl.
*B29B 7/74*        (2006.01)
*B29B 7/40*        (2006.01)
(Continued)

(52) U.S. Cl.
CPC ............ *B29B 7/7414* (2013.01); *B29B 7/407* (2013.01); *B29B 7/582* (2013.01); *B29B 7/60* (2013.01);
(Continued)

(58) Field of Classification Search
CPC ....... B29B 7/7414; B29B 7/407; B29B 7/582; B29B 7/60; B29B 7/7657; B29K 2105/04
(Continued)

(56) References Cited

U.S. PATENT DOCUMENTS 3,752,449 A * 8/1973 Schwab .................... B29B 7/80
366/88
4,486,102 A    12/1984 Thiele et al.
(Continued)

FOREIGN PATENT DOCUMENTS

CN    1681630    10/2005
CN    104159675    11/2014
(Continued)

OTHER PUBLICATIONS

Search Report dated Jun. 13, 2019 in Chinese Patent Application No. 201680038096.8.
(Continued)

*Primary Examiner* — Marc C Howell
(74) *Attorney, Agent, or Firm* — Wenderoth, Lind & Ponack, L.L.P.

(57) ABSTRACT

A mixing device includes a first feed opening for a first liquid—preferably gas-laden—plastics component, a second feed opening for a second liquid plastics component, and a discharge opening for discharging a mixture of the first and the second liquid plastics component. The mixing device has a rotating agitator for mixing the first and second liquid plastics components, and a gap remains between the agitator and the discharge opening. An adjustment device is provided which either varies the gap by a relative movement between the discharge opening and the agitator, or varies the size of the discharge opening. A regulating device is connected in signal-transmitting fashion to a sensor for determining a pressure prevailing in the mixing device. The regulating
(Continued)

device sets the gap, or the size of the discharge opening, by the adjustment device such that the pressure prevailing in the mixing device has a predetermined value.

12 Claims, 3 Drawing Sheets

(51) Int. Cl.
  *B29B 7/72*   (2006.01)
  *B29B 7/58*   (2006.01)
  *B29B 7/60*   (2006.01)
  *B29B 7/76*   (2006.01)
  *B29K 105/04*   (2006.01)

(52) U.S. Cl.
  CPC ............ *B29B 7/726* (2013.01); *B29B 7/7657* (2013.01); *B29K 2105/04* (2013.01)

(58) Field of Classification Search
  USPC .......................................................... 366/77
  See application file for complete search history.

(56) References Cited

U.S. PATENT DOCUMENTS

| | | | |
|---|---|---|---|
| 5,902,042 A * | 5/1999 | Imaizumi | B01F 7/008 366/176.2 |
| 5,938,079 A | 8/1999 | Wacker et al. | |
| 6,210,030 B1 | 4/2001 | Ibar | |
| 6,592,249 B1 * | 7/2003 | Hausbichler | B29B 7/407 366/184 |
| 7,230,037 B2 | 6/2007 | Sulzbach et al. | |
| 8,409,700 B2 | 4/2013 | Morhenn et al. | |
| 10,086,341 B2 | 10/2018 | Mader | |
| 2004/0198870 A1 | 10/2004 | Sulzbach et al. | |
| 2010/0330355 A1 | 12/2010 | Morhenn et al. | |
| 2015/0055434 A1 | 2/2015 | Mader | |

FOREIGN PATENT DOCUMENTS

| | | |
|---|---|---|
| DE | 1 949 756 | 4/1971 |
| DE | 44 33 593 | 6/1995 |
| DE | 20 2005 013 008 | 12/2005 |
| DE | 42 35 850 | 11/2008 |
| DE | 10 2008 011 986 | 9/2009 |
| DE | 10 2012 002 047 | 9/2012 |
| EP | 0 090 257 | 10/1983 |
| EP | 1 123 180 | 8/2001 |
| GB | 986814 | 3/1965 |
| JP | 08-267447 | 10/1996 |
| JP | 10-29213 | 2/1998 |
| JP | 2002-527261 | 8/2002 |
| JP | 2008-184605 | 8/2008 |
| KR | 10-2014-0138339 | 12/2014 |
| RU | 1 796 470 | 2/1993 |
| RU | 2 119 504 | 9/1998 |
| RU | 2 262 438 | 10/2005 |
| WO | 00/23235 | 4/2000 |
| WO | 2013/149273 | 10/2013 |

OTHER PUBLICATIONS

International Search Report dated Sep. 27, 2016 in International (PCT) Application No. PCT/AT2016/050228.

* cited by examiner

MIXING DEVICE WITH ADJUSTMENT DEVICE FOR GAP SETTING

BACKGROUND OF THE INVENTION

The present invention concerns a mixing device.

The invention can be particularly preferably used in the production of foamed plastics (for example, in the form of plastic seals). To achieve a desired microstructure of the plastic, it is necessary for a pressure which is in a given pressure window to apply in the mixing device. If there is a gas nucleation of one of the two liquid plastic components, the given pressure window also depends on the gas nucleation. If the desired discharge amount from the discharge opening varies, that can result in the microstructure of the foamed plastic being of a severely fluctuating quality.

It is known that variations in the quality of the microstructure can also occur upon fluctuations in temperature or viscosity of the first and second liquid plastic components and due to contamination in the mixing device.

Measures are therefore already known to stabilize the temperature, to remove contamination, to keep the viscosity constant, and to use different nozzles for adaptation to different discharge amounts. Thus, DE 42 35 850 B4 discloses a mixing device of the general kind set forth, whose agitator performs a dual function. More specifically, on the one hand, the agitator function and on the other hand the function of closing the discharge opening. To perform the closure function, the agitator is arranged in a mixing chamber of the mixing device in such a way that it can be raised and lowered. The outlet nozzle housing is interchangeable to be able to provide for adaptation to different discharge amounts.

EP 1 123 180 B1 also discloses a mixing device of the general kind set forth, whose agitator performs a dual function as an agitator device and a closure device. To avoid abruptly-occurring opening and closing movements of the agitator, which in the case of processing sensitive materials can give rise to declines in quality in the workpieces produced from the agitated mixture, the drive unit for raising and lowering the agitator is equipped with a cam drive, the actuating cam of which has a cam profile with a steady or jerk-free configuration.

The previously known mixing devices have not been concerned with the quality of the microstructure of the plastic foamed from the mixture so that, when the known mixing devices are used, the quality of the microstructure can in part vary greatly.

SUMMARY OF THE INVENTION

The object of the invention is to achieve a uniform quality of the microstructure of the foamed plastic.

The invention is based on the surprising realization that it is possible to achieve a uniform quality for the microstructure of the foamed plastic automatically by keeping the pressure in the mixing device constant. In that way, changes in the discharge amount, fluctuations in temperature and viscosity of the first and second liquid plastic components, and contamination which in fact influence the pressure in the mixing device in an unpredictable fashion can be eliminated.

The level of the pressure in the mixing device is inter alia dependent on the size of the gap between the agitator and the discharge opening, and on the size of the discharge opening. Further parameters which influence the pressure such as, for example, the dimensioning of the nozzle can be viewed as being constant. By determining the pressure which prevails in the mixing device and adjusting the gap or the size of the discharge opening by sensors, a regulating device, and an adjusting device, the pressure in the mixing device can be set to a desired predetermined value and can be kept substantially constant.

The proposed mixing device is particularly advantageous if the mixing device is operated in the low-pressure range with a pressure prevailing in the mixing device of below about 20 bars. In that pressure range, a gas which for example is present in the first liquid plastic component—for example air dissolved in polyol—can already bubble out in the mixing chamber. The gas which has already bubbled out in the mixing chamber serves as a condensation nucleus and provides for uniform foaming of the mixture upon being discharged from the mixing device.

It was established by trials that, with the proposed mixing device, it is possible to achieve a uniform microstructure for a wide range of different discharge amounts. Thus, for example, through doubling or tripling of the discharge amount, it was possible to achieve a substantially unchanged microstructure and thus a uniform microstructure quality.

The first liquid plastic component can preferably be a viscous liquid. Examples are polyols, silicones, epoxy, polyester, acrylates and MS-polymers.

Examples of the second liquid plastic component are isocyanate and silicones.

Examples of the gas with which the first and/or second liquid plastic component can be mixed are air, nitrogen and carbon dioxide.

The gas can be present in a at least partially dissolved condition in the first and/or second liquid plastic component.

Further examples of systems comprising at least two components are:

Addition of cross-linking silicone with silicone as the first liquid plastic component and silicone as an addition cross-linking cross-linking agent, Condensation of cross-linked silicone, for example, with water and/or glycols, or in accordance with DE 10 2008 011 986 A1 with silicone as viscous liquid and water and/or glycols as condensation cross-linking cross-linking agent, polyurethane (result) cross-linked with isocyanate as curing agent. The polyol component as liquid can contain for example polyester polyols, polyether polyols, thiols, glycols, amines, chain lengtheners and acrylates. The isocyanates can be aromatic (for example on an MDI, TDI basis) and aliphatic (for example on an HDI, IPDI, 12 times hydrated MDI basis), polyisocyanorates, the second component contains the trimerisation catalysts and possibly also polyols, other substances with active hydrogen or non-reactive thinners, 1K NCO terminated polyurethanes with water and/or glycols as curing or cross-linking agents (booster systems), epoxy resin systems, silane-modified polymers with water and/or glycols in the B component, for example MS polymers, acrylates, radically hardened, unsaturated polyester resins, radically hardened, vinylester resins, radically hardened.

According to a preferred embodiment, the agitator can be adapted to be displaceable relative to the discharge opening. In that respect, the adjusting device can be connected to the agitator, in which case the agitator is moveable relative to the discharge opening by the adjusting device.

The adjusting device can include a linear motor which is preferably arranged on a shaft of the agitator.

The discharge opening can be adapted to be variable in size. In that respect, the adjusting device can be connected to the discharge opening, in which the size of the discharge opening is variable by the adjusting device. The adjusting device can be, for example, in the form of an iris-like aperture, the discharge opening being formed by the central region, that remains free, of the iris aperture. Alternatively, the adjusting device can be in the form of an elastic element in the manner of a hose clip, the discharge opening being formed by the internal width, that remains free, in the hose.

If the mixing device has an elongated configuration, it may be advantageous if the at least one feed opening for the at least one first liquid plastic component and the at least one further feed opening for the at least one second liquid plastic component are arranged at different axial positions of the mixing device. Because mixing of the two liquid plastic components first occurs in the region of that feed opening which is closer to the discharge opening, no or only slight contamination occurs in the region disposed axially above the same.

The discharge opening of the mixing device can be connected to a nozzle.

Preferably, the predetermined value for the pressure prevailing in the mixing device is less than 20 bars, preferably less than 10 bars, particularly preferably between about 2 and about 4 bars.

In addition, an arrangement comprises a mixing device according to at least one of the preceding embodiments, and a source for the at least one first liquid plastic component. The source is connected to the at least one feed opening for the at least one first liquid plastic component, and preferably the at least one first liquid plastic component is mixed with a gas. A source is provided for the at least one second liquid plastic component, and that source is connected to the at least one further feed opening for the at least one second liquid plastic component. Preferably, the at least one second liquid plastic component is mixed with a gas.

BRIEF DESCRIPTION OF THE DRAWINGS

Embodiments of the invention are discussed with reference to the Figures, in which.

DETAILED DESCRIPTION OF THE INVENTION

Figure 1:
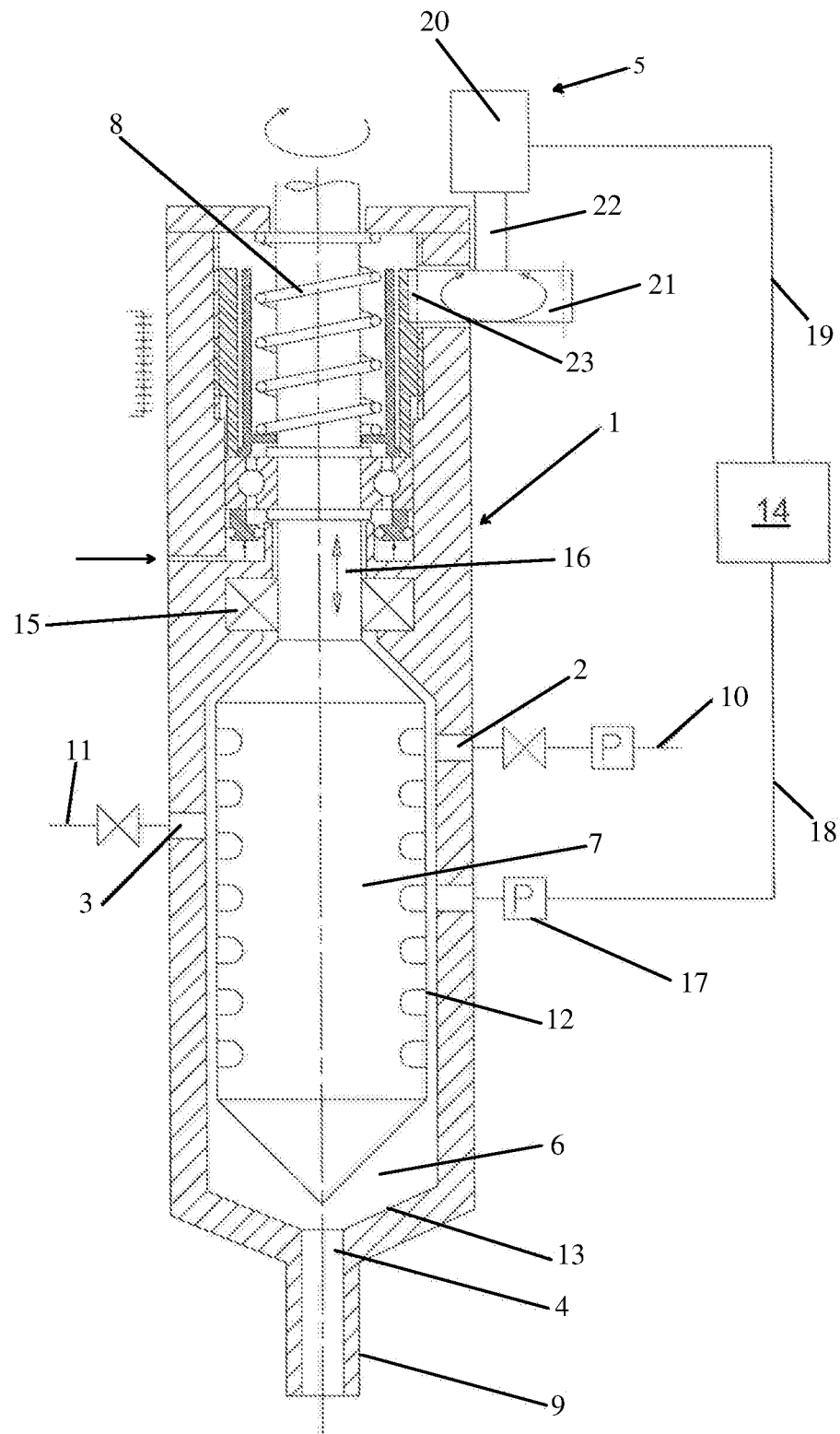
FIG. 1 shows a first embodiment of a mixing device according to the invention.

FIG. 1 shows a mixing device 1 having a mixing chamber 12. The Figure shows a first feed opening 2 for at least one first liquid component (for example, polyol) and a second feed opening 3 for at least one second liquid plastic component (for example isocyanate), which lead into the mixing chamber 12. The mixing device 1 is a dynamic mixing device and includes an agitator 7 which is rotatable in the mixing chamber 12. The first and/or the second liquid plastic component can be mixed with a gas—for example air.

To produce the mixture consisting of the first and second liquid plastic components, the first liquid plastic component which is mixed with air in this example and which is provided by a first source 10 is introduced through the first feed opening 2, and the second liquid plastic component which is provided by a second source 11 is introduced through the second feed opening 3 at different axial positions of the mixing device 1 which here is of an elongated configuration. Mixing of those two components is effected by the rotating agitator 7.

Provided adjacent to the tip of the agitator 7 is a discharge opening 4 for discharge of the mixture comprising the first and second liquid plastic components from the mixing chamber 12. The mixture can be discharged from the discharge opening 4 in the direction of a nozzle 9 by a gap 6 remaining between the agitator 7 and the discharge opening 4.

There is provided an adjusting device 5 by which a relative movement between the discharge opening 4 and the agitator 7 can be produced, and thus the gap 6 between the agitator 7 and the discharge opening 4 is variable. The adjusting device 5 has a stepping motor 20 which engages a gear 21 by way of a shaft 22, the gear 21 laterally engaging into a screw sleeve 23 arranged concentrically with respect to the shaft 16. Rotation of the gear 21 by the stepping motor 20 causes axial displacement of the screw sleeve 23 whereby height adjustment of the agitator 7 is effected, thereby setting the gap 6 between the agitator 7 and the discharge opening 4. Measurement of the adjustment made can be implemented by way of the diagrammatically illustrated scale and communicated to the regulating device 14 (the corresponding signal lines are not shown). During the metering operations, air is introduced into the region above the seal 15 in the direction of the diagrammatically illustrated arrow, which leads to lifting of the agitator 7 against the force applied by the force storage means 8 until reaching the abutment condition defined by the screw sleeve 23. When the air pressure is switched off, the force storage means 8 moves the agitator 7 in the direction of the discharge opening 4 (downwardly in this view) to such an extent that the agitator 7 closes the discharge opening 4.

To determine a pressure prevailing in the mixing device 1 or the mixing chamber 12 thereof, a sensor 17 is in signal-conducting relationship with a regulating device 14 by way of a signal line 18. The regulating device 14 in turn is in signal-conducting relationship with the adjusting device 5 by way of a control line 19 so that the regulating device 14 can set the gap 6 by way of the adjusting device 5 in such a way that the pressure prevailing in the mixing device 1 or its mixing chamber 12 is at a predetermined value of, for example, less than 20 bars. As an alternative to the illustrated positioning of the sensor 17, it is also possible to conceive other positions, for example in the line 10.

In the present embodiment, the pressure conditions are selected so that there is a constant pressure in the mixing chamber 12, which is sufficiently low that a foaming agent present in the mixture can foam out.

If, during or after a process of discharging, the mixture from the mixing device 1, the pressure in the mixing device 1 or its mixing chamber 12 changes, that change in pressure can be detected by the sensor 17 and the regulating device 14 can actuate the adjusting device 5 in such a way that that change in pressure is counteracted by a corresponding relative movement between the agitator 7 and the discharge opening 4, and the desired predetermined pressure is maintained in the mixing device 1. In particular, suitable pressure adaptation can be implemented after each discharge process or after each metering operation.

A seal 15 (which can act sealingly in one direction or in both directions) sealingly surrounds the rotating shaft 16 of the agitator 7 and seals off the mixing chamber 12 in the region of the shaft 16 of the agitator 7. The seal 15 can, for example, comprise Teflon and can permit smooth axial movement of the rotating shaft 16. By virtue of the fact that the shaft 16 rotates and the seal 15 causes slight friction, it is possible to achieve very fine positional adaptation of the agitator 7. In particular, it is possible in that way to avoid unwanted pressure fluctuations due to abrupt axial displacement of the agitator 7 as a consequence of a stick-slip effect. The axial displacement of the agitator 7 is also facilitated by the rotation of the shaft 16. Preferably, the seal 15 is in the form of a rotational and translational seal.

Figure 2:
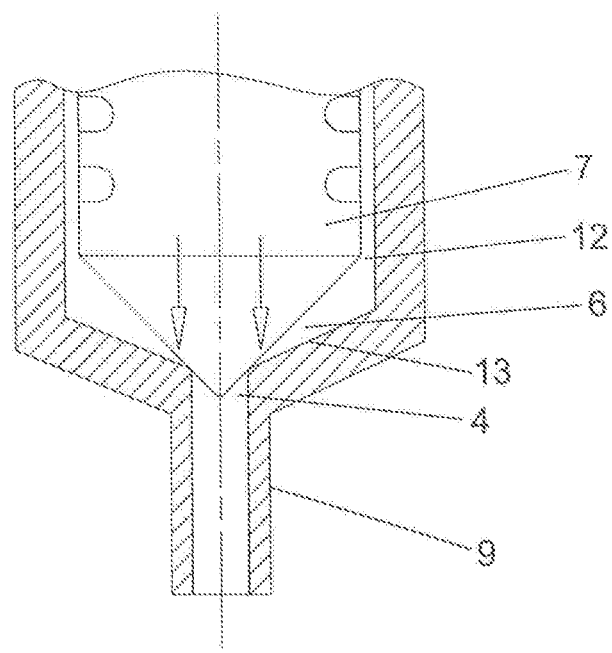
FIG. 2 shows a detail view of the mixing device of FIG. 1.

FIG. 2 shows a detail view of the tip of the agitator 7 of the mixing device 1 as shown in FIG. 1 in an altered operating state in which the agitator 7 has been moved axially relative to the discharge opening 4 to such an extent that it closes the discharge opening 4. The tip of the agitator 7 is more pointed than the inclination of the end face 13 of the mixing chamber. In other words, an angle of inclination of a tip of the agitator (screw sleeve) 7 relative to a longitudinal axis of the agitator is smaller than an angle of inclination of the end face 13 of the mixing chamber. As a result, the tip of the agitator 7 only bears in annular relationship against the end face 13 and projects into the discharge opening 4 to close it off in an annular shape.

Figure 3:
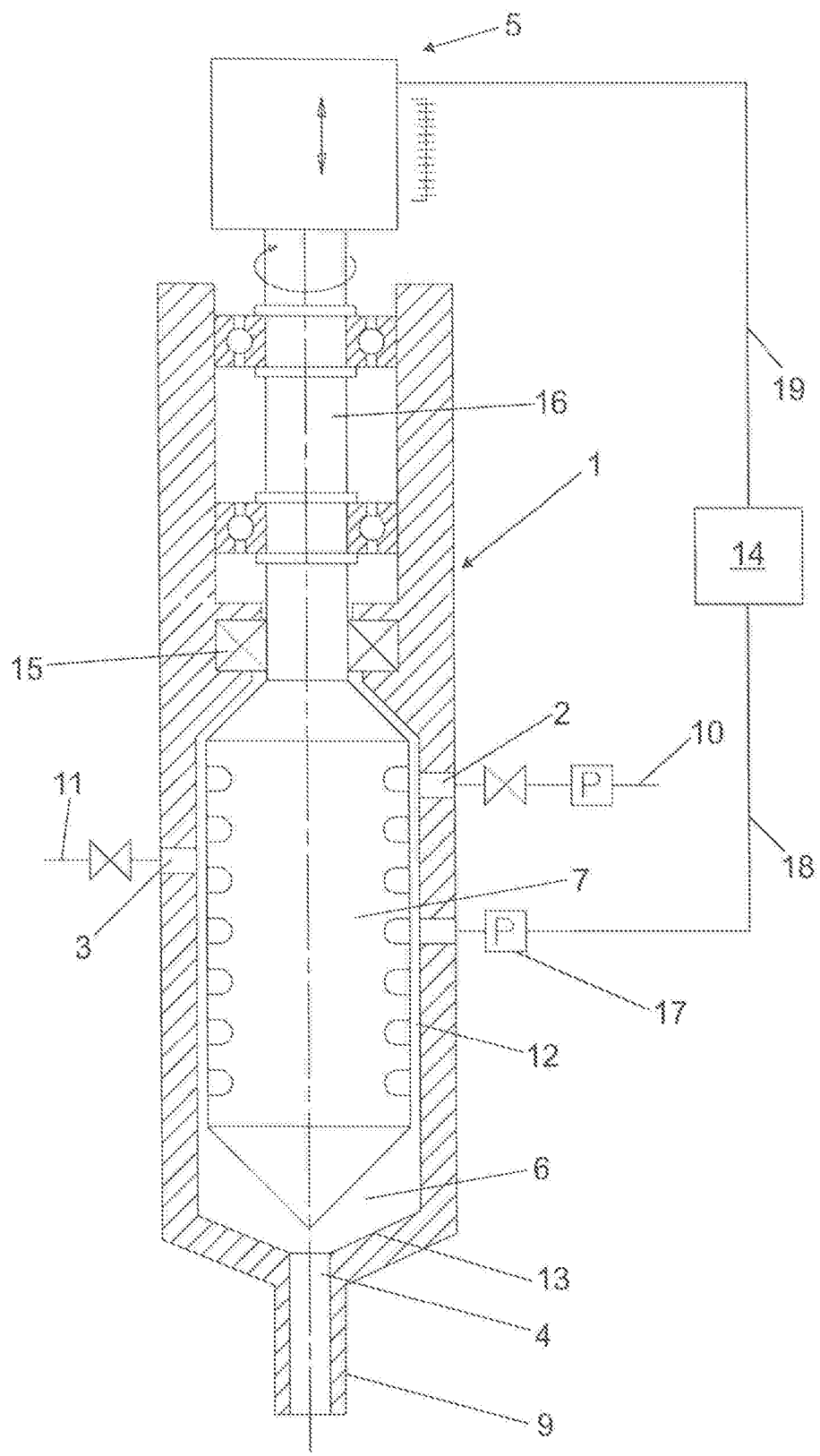
FIG. 3 shows a second embodiment of a mixing device according to the invention.

FIG. 3 shows a further embodiment of a proposed mixing device 1. Unlike the embodiment of FIG. 1, in this case the adjusting device 5 includes a linear motor which is arranged on the shaft 16 of the agitator 7 and which can directly axially raise and lower the agitator 7 and can thus bring about the required relative movement between the agitator 7 and the discharge opening 4 to alter the gap 6 to the required extent so that the pressure prevailing in the mixing device 1 or the mixing chamber 12 thereof is at the desired predetermined value. Measurement of the adjustment made can be effected by the diagrammatically illustrated scale and communicated to the regulating device 14 (the corresponding signal lines are not shown).

As a difference from the illustrated configuration, the adjusting device 5 for example can also include a per se known cam drive, spindle drive or hydraulic drive.

LIST OF REFERENCES

1 mixing device
2 first feed opening for at least one first liquid plastic component
3 second feed opening for at least one second liquid plastic component
4 discharge opening
5 adjusting device
6 gap
7 agitator
8 force storage means
9 nozzle
10 source for at least one first liquid plastic component
11 source for at least one second liquid plastic component
12 mixing chamber
13 end face
14 regulating device
15 seal
16 shaft
17 sensor
18 signal line
19 control line

The invention claimed is:

1. A mixing device comprising:
a first feed opening for a first liquid plastic component;
a second feed opening for a second liquid plastic component;
a body having a mixing chamber and a discharge opening for discharge of a mixture to be produced in the mixing chamber and comprising the first liquid plastic component and the second liquid plastic component;
a rotating agitator for mixing the first liquid plastic component and the second liquid plastic component, the agitator being arranged such that a gap remains between the agitator and the discharge opening;
an adjusting device configured to either alter a size of the gap by a relative movement between the discharge opening and the agitator or alter the size of the discharge opening, the adjusting device including an axially-movable screw sleeve arranged concentrically with a shaft of the agitator such that an axial position of the agitator is adjusted as the screw sleeve is moved axially to thereby adjust a size of the gap;
a sensor for determining a pressure prevailing in the mixing device; and
a regulating device in a signal-conducting relationship with the sensor, wherein the regulating device is configured to set the gap or the size of the discharge opening by controlling the adjusting device such that the pressure prevailing in the mixing device is at a predetermined value;
wherein an angle of inclination of a tip of the screw sleeve relative to a longitudinal axis of the screw sleeve is smaller than an angle of inclination of an end face of the mixing chamber.

2. The mixing device as set forth in claim 1, wherein the agitator is displaceable relative to the discharge opening.

3. The mixing device as set forth in claim 2, wherein the adjusting device further includes a gear driven by a motor, the gear engaging the screw sleeve so rotate the screw sleeve and thereby move the screw sleeve axially.

4. The mixing device as set forth in claim 1, wherein the discharge opening is variable in size.

5. The mixing device as set forth in claim 4, wherein the adjusting device is connected to the discharge opening to vary the size of the discharge opening.

6. The mixing device as set forth in claim 1, wherein the mixing device has an elongated configuration, and the first feed opening for the first liquid plastic component and the second feed opening for the second liquid plastic component are arranged at different axial positions of the mixing device.

7. The mixing device as set forth in claim 1, wherein the discharge opening of the mixing device is connected to a nozzle.

8. The mixing device as set forth in claim 1, wherein the regulating device is configured to control the adjusting device to maintain the pressure prevailing in the mixing device at the predetermined value, the predetermined value being less than 20 bars.

9. The mixing device as set forth in claim 8, wherein the predetermined value is less than 10 bars.

10. The mixing device as set forth in claim 9, wherein the predetermined value is between about 2 bars and about 4 bars.

11. An arrangement comprising the mixing device as set forth in claim 1, and
a first source for the first liquid plastic component, the first source being connected to the first feed opening for the first liquid plastic component, and
a second source for the second liquid plastic component, the second source being connected to the second feed opening for the second liquid plastic component.

12. The arrangement as set forth in claim 11, wherein each of the first liquid plastic component and the second liquid plastic component is mixed with a gas.

\* \* \* \* \*